United States Patent [19]
Mihic

[11] Patent Number: 5,392,674
[45] Date of Patent: Feb. 28, 1995

[54] TOOL ARRANGEMENT FOR MACHINING RESTRICTED SPACES, E.G. FOR INTERNAL TURNING

[75] Inventor: Wlajko Mihic, Gävle, Sweden

[73] Assignee: Mircona AB, Gävle, Sweden

[21] Appl. No.: 140,031

[22] PCT Filed: May 4, 1992

[86] PCT No.: PCT/SE92/00286
§ 371 Date: Oct. 29, 1993
§ 102(e) Date: Oct. 29, 1993

[87] PCT Pub. No.: WO92/19403
PCT Pub. Date: Nov. 12, 1992

[30] Foreign Application Priority Data
May 2, 1991 [SE] Sweden ................. 9101323

[51] Int. Cl.⁶ ................. B23B 27/08; B23B 29/02
[52] U.S. Cl. ................. 82/158; 407/104; 407/106; 407/108
[58] Field of Search ........... 82/158; 407/104, 106, 407/107, 108

[56] References Cited

U.S. PATENT DOCUMENTS

| | | | |
|---|---|---|---|
| D. 293,914 | 1/1988 | Hudson | D15/139 |
| 1,668,351 | 5/1928 | Black | 407/56 |
| 2,924,129 | 2/1960 | Munro | 407/65 |
| 3,002,405 | 10/1961 | Heftler | 407/74 |
| 3,245,288 | 4/1966 | Fried | 407/111 |
| 3,298,254 | 1/1967 | Vassallo | |
| 3,635,574 | 1/1972 | Schiller | 407/41 |
| 3,754,309 | 8/1973 | Jones et al. | |
| 4,102,591 | 7/1978 | Alcorn | |
| 4,602,897 | 7/1986 | Teets | |
| 4,714,384 | 12/1987 | Lagerberg | |

FOREIGN PATENT DOCUMENTS

| | | |
|---|---|---|
| 0268001 | 5/1988 | European Pat. Off. |
| 337732 | 8/1971 | Sweden |
| 373515 | 2/1975 | Sweden |
| 463753 | 1/1991 | Sweden |

Primary Examiner—William E. Terrell
Attorney, Agent, or Firm—Ware, Fressola, Van Der Sluys & Adolphson

[57] ABSTRACT

In a tool arrangement, an end part of a holder shaft is provided with a seat which provides a stable support for a cutter insert in at least two of the principal directions utilized in a machining operation. Stresses imposed on the cutter insert during the machining operation are transferred in an effective fashion to the shaft. The arrangement includes at least one tightenable fastening device which, after tightening, engages with the cutter insert and forces it against at least one surface of the seat. The cutter insert has stop parts with which the fastening device is intended to engage only after the cutter insert, through displacement relative to the seat on the shaft and whilst the cutter insert still in contact with the seat, has reached its operating position.

5 Claims, 2 Drawing Sheets

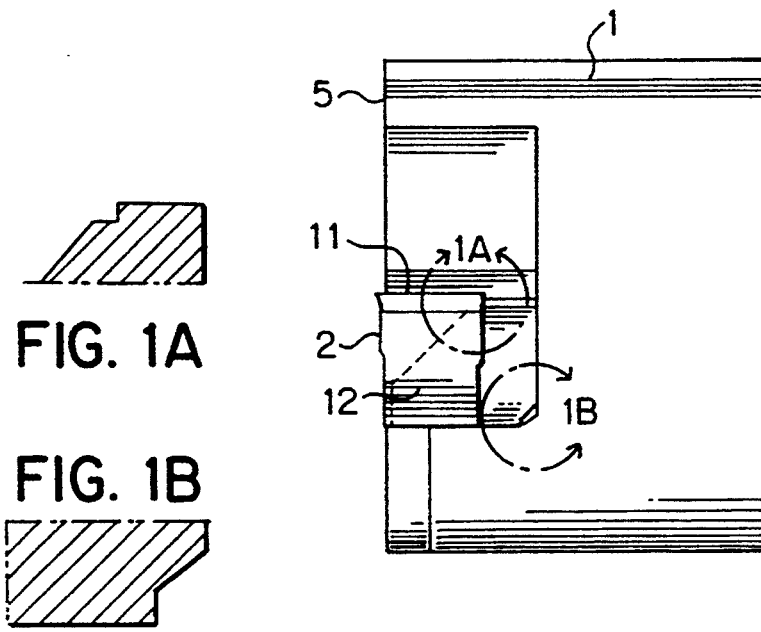
FIG. 1
FIG. 1A
FIG. 1B
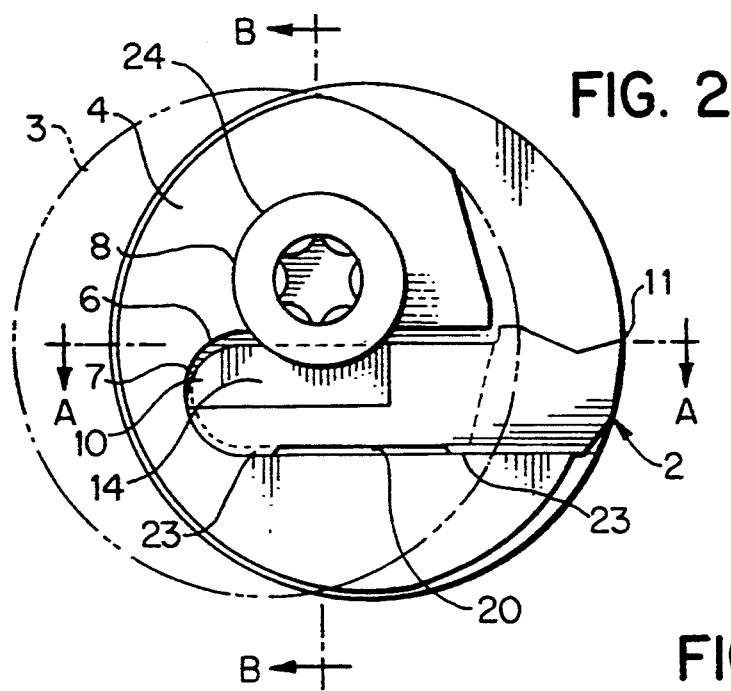
FIG. 2
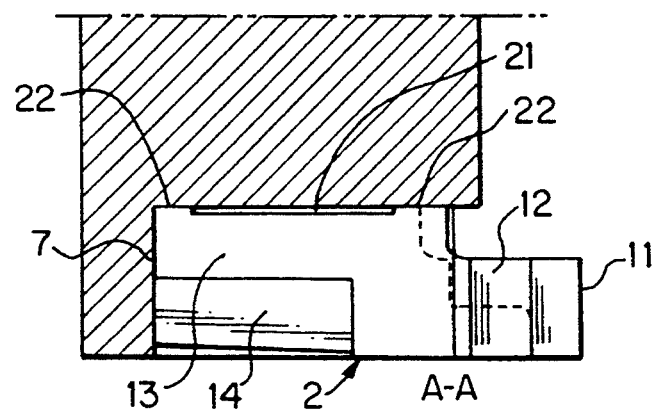
FIG. 3

A-A

B-B

TOOL ARRANGEMENT FOR MACHINING RESTRICTED SPACES, E.G. FOR INTERNAL TURNING

BACKGROUND OF THE INVENTION

The invention relates to an arrangement for tools for cutting and machining, in particular, turning in restricted spaces, for example, turning inside a hole or in a tube-like workpiece.

Tools intended for operations of this kind are previously known and, as a general rule, comprise a cutter of hardened metal material, carbide material or the like attached to the end of a shaft by means of a threaded connection. To remove a worn cutter so a new one can be installed, it is necessary to fully loosen a screw passing through the cutter before the cutter can be removed or attached. In this replacement operation, it is necessary to keep track not only of the cutter, which in many cases is very small, but also of the loose screw, and to fit the latter into a threaded hole in the shaft. This makes the operation difficult so the machine operator tends to use a cutter for an excessive period in order to avoid having to change the cutter.

SUMMARY OF THE INVENTION

It is an object of the present invention to provide a novel arrangement which securely grips the cutter and facilitates the replacement of the cutters without the need for handling of loose components other than the cutter itself.

This object can be achieved by the provision of a seat at the end part of the shaft. The seat provides positioning of and a stable support for a cutter in at least two of the principal directions utilized in the machining operation, so that the stresses imposed on the cutter during such machining are transferred in an effective fashion to the shaft. At least one tightenable fastening device is arranged on the shaft and engages with the cutter after tightening so as to force it against at least one surface on the seat. The fastening device is intended to engage stop parts on the cutter only after the cutter, through displacement of the cutter relative to the seat on the shaft and whilst the cutter is still in contact with the seat, has reached its operating position.

BRIEF DESCRIPTION OF THE DRAWINGS

The invention is described in more detail below with reference to the accompanying drawings, in which:

FIG. 1 is a side elevational view from the side of the end part of a first embodiment of a tool arranged in accordance with the invention;

FIGS. 1A and 1B are enlarged views of portions of the tool of FIG. 1 within the 1A and 1B lines of FIG. 1;

FIG. 2 is a front elevational view of the same tool;

FIG. 3 is a cross-sectional view taken along the line A—A in FIG. 2;

DETAILED DESCRIPTION OF THE INVENTION

Figure 4:
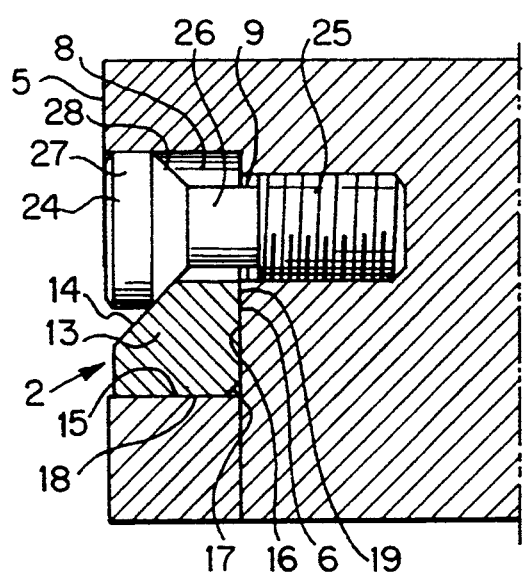
FIG. 4 is a cross-sectional view taken along the line B—B in FIG. 2.
Figure 5:
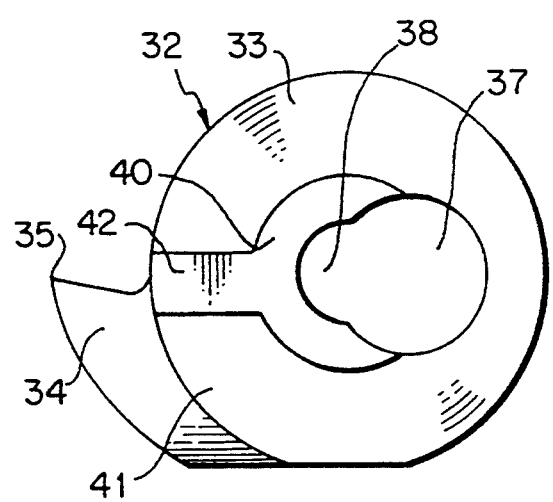
FIG. 5 is a side elevational view of a modified embodiment of a cutter viewed from the side facing towards the shaft.
Figure 6:
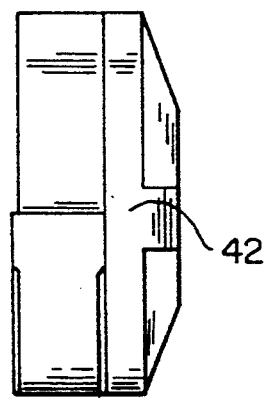
FIG. 6 is a side elevational view of the cutter in accordance with FIG. 5 viewed from the side on which the cutting edge projects.
Figure 7:
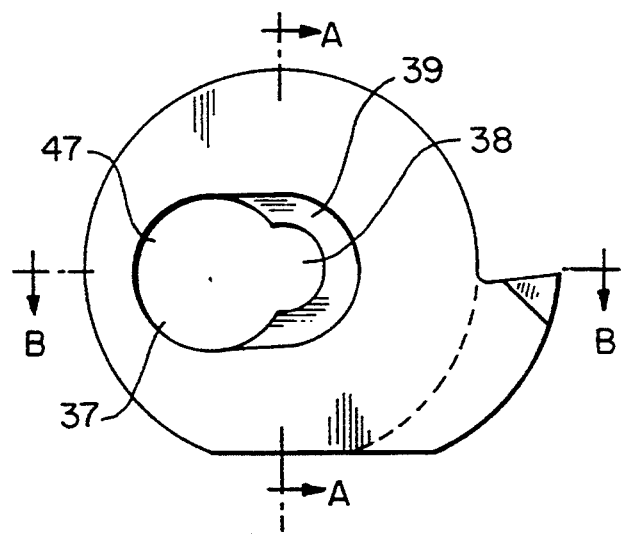
FIG. 7 is a side elevational view of the cutter in accordance with FIG. 5 viewed from the outward-facing side.
Figure 8:
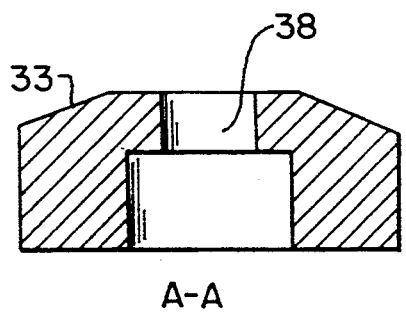
FIG. 8 is a cross-sectional view taken along the line A—A in FIG. 7.
Figure 9A:
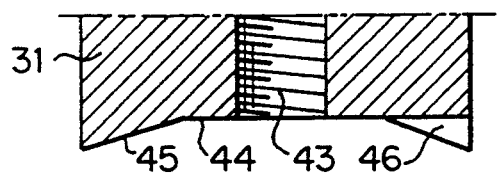
FIG. 9A is a cross-sectional view of a support shaft upon which the cutter of FIG. 9 can be fitted.
Figure 9:
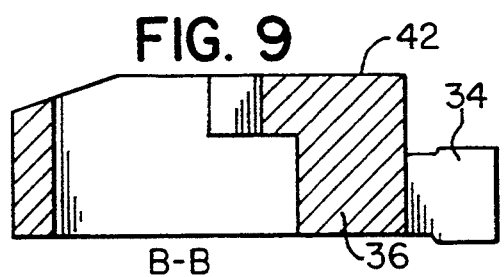
FIG. 9 is a cross-sectional view taken along the line B—B in FIG. 7.

The numeral 1 is used to designate a shaft 1 of a tool holder, which at its end is intended to carry a tool, more specifically, a cutter generally designated by 2. The tool 2 in question here is intended for turning in restricted spaces, for example, inside a hole, or in a tubular workpiece or the like.

The shaft 1, which may be of circular cross-section along a further part 3 indicated in FIG. 2 by a dashed and dotted line, exhibits a thinner end part 4 of non-round cross-section produced by machining one side thereof at its end surface 5. Arranged on or at the end surface 5 is a transverse groove 6 terminated by a curved end wall 7. Situated next to the transverse groove 6 in a partially overlapping relationship is a circular recess 8 with a coaxially threaded central bore 9 (FIG. 4) arranged in the longitudinal direction of the shaft 1.

The cutter 2 is bar-shaped with an essentially rectangular cross-section and has a base part 13 with a rounded inner end 10 and a laterally displaced projection 12 at the other end for supporting a cutting edge 11. A corner of the base part 13 is chamfered in connection with the inner end 10 of the cutter 2 so as to produce an inclined surface 14. As shown in FIG. 4, the base part 13 has an opposite corner, which connects bottom and side surfaces 15 and 16 of the cutter 2 and exhibits a small chamfer 17 providing a longitudinal clearance between bottom and side abutment walls 18 and 19 of the transverse groove 6 and the bottom and side surfaces 15 and 16 of the cutter 2. Referring to FIGS. 2 and 3, shallow recesses 20 and 21 are arranged on the aforementioned bottom and side surfaces 15 and 16 of the cutter 2, so that only end heels 22 and 23 remain. The purpose of the chamfer 17 and the aforementioned heels 22 and 23 is to permit the cutter to rest in a stable fashion against the walls 18 and 19 of the groove 6.

Referring again to FIG. 4, a threaded fastening element, which is designated by 24, in the form of a screw has a threaded shaft part 25 which engages with the threaded central bore 9, a cylindrical transitional part 26 and a cylindrical head 27 with a frustoconical underside 28 forming essentially the same angle with the longitudinal axis of the supporting shaft as the inclined surface 14 on the cutter 2.

When installing a cutter 2, the fastening element 24 must be loosened slightly so that the inner end 10 of the cutter 2 can be displaced laterally into the groove 6 for such a distance that it bottoms against the curved end wall 7 of the groove so inclined surface 14 is positioned beneath the inward-facing frustoconical surface 28 of the screw head 27. As the screw 24 is tightened, the frustoconical surface 28 will engage with the inclined surface 14 of the cutter 2 and will force the cutter inwardly so that the end heels 22 and 23 come into stable contact with the bottom and side abutment walls 18 and 19 of the groove 6.

The fastening element may have a right-hand or a left-hand thread, depending on the intended working direction of the cutting edge 11, so that as vibrations arise, the fastening element 24 does not exhibit a tendency to turn in a direction which causes the cutter 2 to move out of the groove 6. The fastening element 24 may have a left-hand thread in the embodiment shown in FIGS. 1–4.

The present invention provides simple handling which facilitates cutter replacement to a considerable degree. It will be appreciated by those skilled in the art that the present invention is in no way more bulky than the previously disclosed designs.

A second embodiment of the invention is illustrated in FIGS. 5–9 and differs purely in terms of its design from the previously described embodiment. It can be used for the machining of holes and the like with a diameter only slightly exceeding the diameter of the shaft of the tool holder.

The cutter in accordance with FIGS. 5–9, which is generally designated by 32, includes circular main part 33 and an axially displaced essentially radially extending projection 34, which supports a cutting edge 35. A side 36 (FIG. 9) facing away from the shaft designated by 31 exhibits a transcurrent hole with an essentially round hole part 37 situated eccentrically or in a radially offset fashion away from the side with the projection 34, and a hole part 38 integral with the hole part 37 and similarly transcurrent, although centrally situated and with a smaller diameter or area than the hole 37, which the hole part 38 is surrounded by a countersunk part 39 (FIG. 7) arranged concentrically around it, which extends forwards as far as the edge of the hole part 37. The countersunk part. 39 forms a step-like edge around the centrally situated hole part 38.

The side of the cutter 32 facing towards the supporting shaft 31, which can be appreciated most clearly from FIGS. 5, 6, 8 and 9, exhibits a plane central surface part 40, which encloses the major proportion of the central hole part 38 and in so doing terminates at the further hole part 37. Situated radially outside the surface part 40 is a conically tapered part 41 with a top angle of the order of 140°, which is also intersected by the larger hole part 37. A heel 42, the outward-facing side of which lies in the same plane as the plane central surface part 40, extends over the conically tapered part 41 in the direction of the cutting edge 35 and the projection 34. The heel 42 thus exhibits essentially parallel triangular lateral surfaces.

The end part of the supporting shaft 31 for the cutter 32 is executed in a complementary fashion and has a central threaded bore 43 surrounded by a plane annular surface 44, to which an enclosing inclined surface 45 is connected. The inclined surface 45 is interrupted by a groove 46 with an outwardly increasing depth adapted to the form of the heel 42.

When fitting a cutter 32 to the supporting shaft 31, a screw such as that indicated in FIG. 1 with the designation 24 must be unscrewed for a sufficient distance to permit the screw head to be introduced through the larger hole part 37, i.e. with the cutter 32 in a laterally displaced position. The cutter 32 is then centered on the end of the supporting shaft 31 by displacing the shank of the screw into the smaller hole part 38, in conjunction with which the heel 42 is fitted at the same time into the groove 46, which positions the cutter 32 in such a way as to prevent it from rotating about its center. Once the cutter 32 has reached the indicated position, the screw is tightened. Removal takes place in the reverse sequence.

The interaction between the plane and conical surfaces and the rotational stabilization by means of the heel 42 mean that the cutter 32 is fixed in a stable fashion, and that the desired distribution of forces is obtained.

The invention is not limited to the embodiments shown above but can be varied within the framework of the following patent claims.

It is claimed:

1. Arrangement for tools for use in a cutting machine operation, in particular, for machining in restricted spaces such as internally in holes and inside hollow workpieces, comprising:
   (a) a holder shaft having one free end with a free end face;
   (b) a cutter holder on said free end of said holder shaft and being provided with both a transverse groove dimensionally sized to receive a cutter insert and a threaded bore for receiving a threaded fastening device, said transverse groove located on said free end face of said holder shaft and being defined at least partially by at least two abutment surfaces, said transverse groove arranged adjacent said threaded bore;
   (c) a cutter insert arranged in said transverse groove of said cutter holder, said cutter insert having at least two engagement portions in contact with said abutment surfaces of said cutter holder so as to prevent movement of said cutter insert relative to said cutter holder caused by stresses during the cutting machine operation, each of said engagement portions of said cutter insert includes a long shallow recess separating supporting heels adjacent edges of the respective engagement portion for providing a stable movement-free clamping of said cutter insert towards said abutment surfaces, said cutter insert also being provided with an outwardly facing contact surface arranged to be engaged by a threaded fastening device located in said threaded bore at said free end of said holder shaft so as to stabilize said cutter insert; and
   (d) a threaded fastening device having a threaded shaft portion in said threaded bore of said cutter holder, said threaded fastening device having a cylindrical head and, between said cylindrical head and said threaded shaft portion, a contact surface inclined towards said screw shaft portion, said threaded fastening device moveable between a tightened position with said inclined contact surface of said threaded fastening device engaged with said contact surface of said cutter insert to fix said cutter insert in said transverse groove of said cutter holder and a loosened position in which said cutter insert is freely moveable in said transverse groove.

2. The arrangement in accordance with claim 1, wherein said outwardly facing contact surface of said cutter insert is inclined essentially at the same angle as said inclined contact surface of said threaded fastening device.

3. The arrangement in accordance with claim 1, wherein said inclined contact surface of said threaded fastening means has a frustoconical shape.

4. The arrangement in accordance with claim 1, wherein said cutter holder has a recess merging into said threaded bore, said cylindrical head of said threaded fastening means is dimensionally sized for mating engagement with said recess.

5. The arrangement in accordance with claim 1, wherein said abutment surfaces of said cutter holder are arranged along axial and radial planes of said holder shaft.

* * * * *